United States Patent [19]

de la Rosa

[11] Patent Number: 4,604,053
[45] Date of Patent: Aug. 5, 1986

[54] FOOD WARMING CARTRIDGE

[76] Inventor: Rudolpho de la Rosa, 2639 Tanglewood, Grapevine, Tex. 76051

[21] Appl. No.: 715,678

[22] Filed: Mar. 25, 1985

[51] Int. Cl.$^4$ .............................................. F23D 3/24
[52] U.S. Cl. ................................ 431/320; 126/45; 126/96; 431/312
[58] Field of Search ............... 126/38, 43, 44, 45, 126/46, 50, 96; 431/320, 323, 325, 298, 344, 310, 312

[56] References Cited

U.S. PATENT DOCUMENTS

| 236,813 | 1/1881 | Hildebrandt . | |
|---|---|---|---|
| 2,784,581 | 3/1957 | Quandt | 431/325 |
| 3,171,398 | 3/1965 | Lawson | 126/38 |
| 3,994,672 | 11/1976 | Novak | 431/320 |
| 4,126,408 | 11/1978 | Cox | 431/2 |
| 4,134,718 | 1/1979 | Kayfetz et al. | 431/125 |

OTHER PUBLICATIONS

"We Won't Set the World on Fire!", 1983 Choice Products (Brochure).

Primary Examiner—Samuel Scott
Assistant Examiner—Noah Kamen
Attorney, Agent, or Firm—James E. Bradley

[57] ABSTRACT

A fuel cartridge for heating food trays uses a liquid fuel and a wick. The cartridge has a container that holds the fuel and has a lid with an aperture formed in it. A flat rectangular fiberglass strip serves as the wick and is pressed against the lower side of the aperture. The lower ends of the wick extend into the fuel, and the central portion of the wick protrudes only slightly from the aperture. A metal ring can be used with the container to block wind currents.

8 Claims, 5 Drawing Figures

FOOD WARMING CARTRIDGE

BACKGROUND OF THE INVENTION

1. Field of the Invention

This invention relates in general to cartridges for warming food trays, and in particular to a cartridge containing a liquid fuel and a wick.

2. Description of the Prior Art

Restaurants with buffet trays normally keep the food warm by using fuel cartridges which are located below the trays and are ignited to provide a flame. The most common type of fuel cartridge consists of an alcohol based paste, with an open top. This type of cartridge has a fairly short duration. Also, the fuel tends to evaporate between usages.

Recently, cartridges containing a liquid fuel have been introduced. These cartridges use a braided fiberglass wick. These cartridges are more expensive than the alcohol paste type.

SUMMARY OF THE INVENTION

A food warming cartridge is provided with this invention of the type that uses a liquid fuel. The cartridge has a container for containing the liquid fuel. The container has a lid that is not removable and contains a aperture. A flat fiberglass felt wick extends into the fuel and is pressed against the lower side of the lid in contact with the slot. A retainer secures the wick tightly against the aperture. The wick protrudes only slightly from the aperture.

Also, for use outdoors, a circular ring may be placed on top of the lid. The ring contains apertures for the passage of air, and serves as a wind guard.

DESCRIPTION OF THE PREFERRED EMBODIMENT

Figure 1:
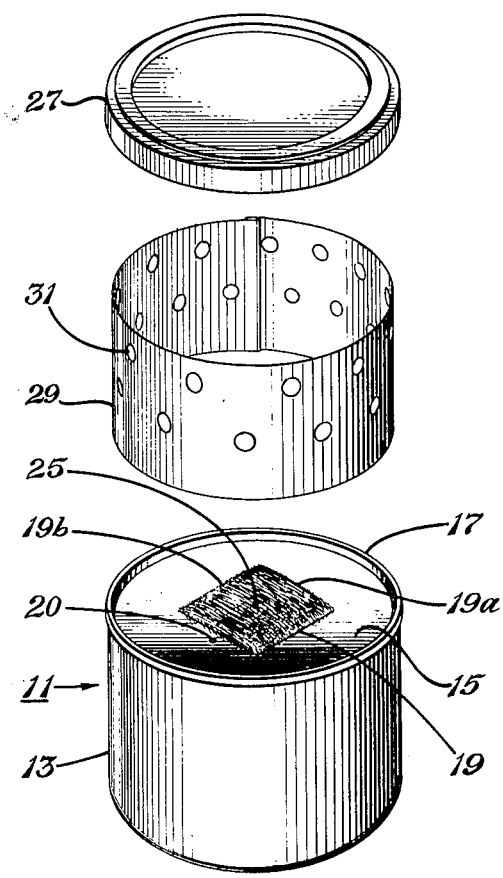
FIG. 1 is a perspective view showing a cartridge, a storage cover, and a wind guard for the cartridge.
Figure 4:
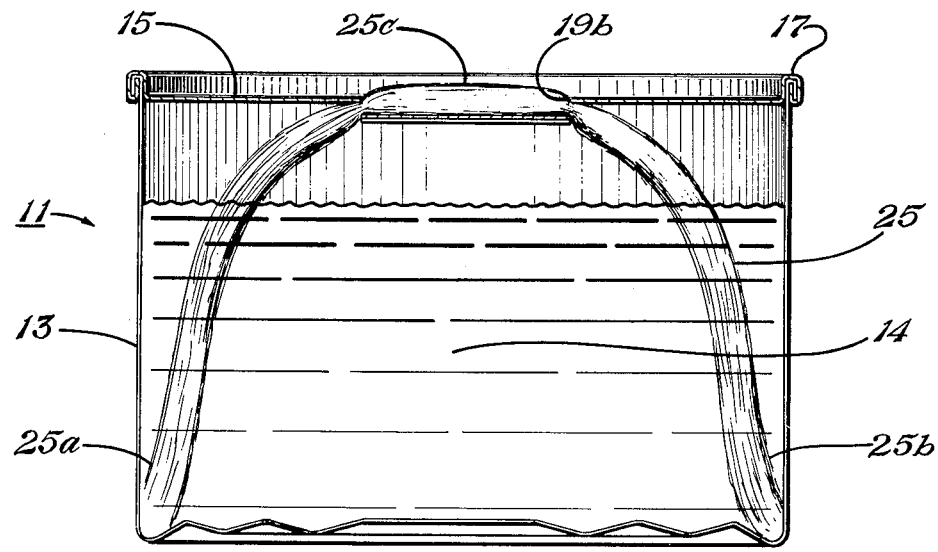
FIG. 4 is a sectional view of the cartridge of FIG. 1, taken along the line IV—IV.

Referring to FIG. 1, food warming cartridge 11 includes a cylindrical container 13. Container 13 is a metal container for holding fuel 14 (FIG. 4). The fuel is preferably diethylene glycol. A lid 15 is permanently secured to the top of the cartridge 11 in the same manner that a lid is formed on a conventional food can. This results in a rim 17 extending around the lid 15 at the upper edges of the sidewall of the container 13. Lid 15 is flat.

Figure 3:
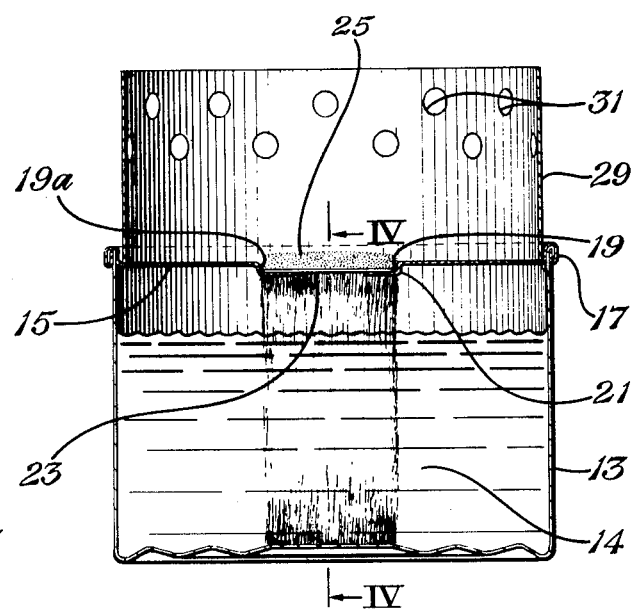
FIG. 3 is a sectional view of the cartridge of FIG. 1, taken along the line III—III of FIG. 2.
Figure 5:
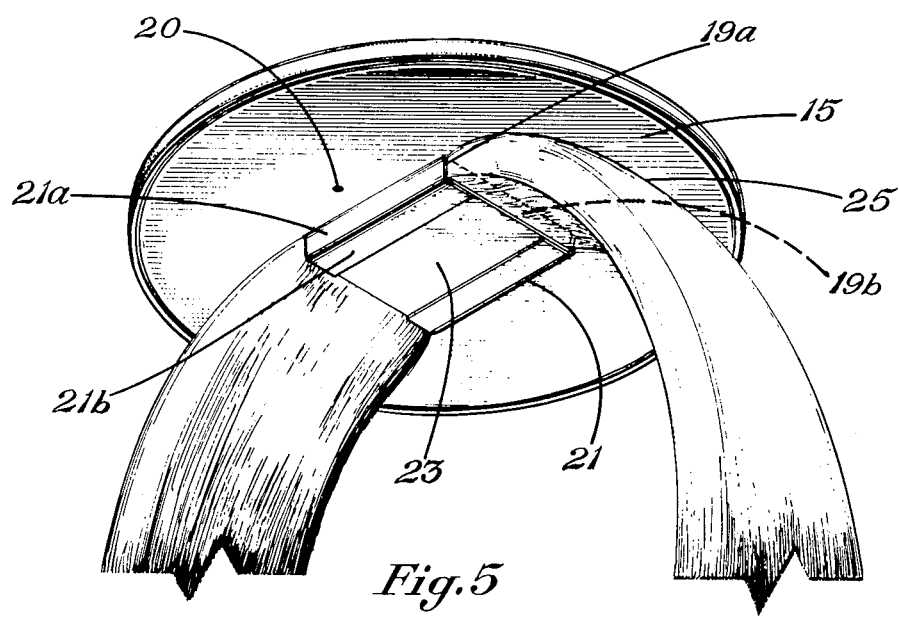
FIG. 5 is a view of the lower side of the lid for the cartridge of FIG. 1, with the cartridge container not shown.

A aperture 19 is formed in the lid 15. Slot 19 is rectangular having two side edges 19a that are parallel with each other and two side edges 19b that are parallel with each other. Referring to FIGS. 3-5, aperture 19 is formed by die cutting the lid 15 prior to securing it to the container 13. When forming the aperture 19, a portion of the lid 15 on each side 19a is bent downwardly and inwardly, forming a bracket 21. Each bracket 21 has a vertical portion 21a that extends downwardly a short distance and a flange portion 21b that extends horizontally in a plane parallel with the plane containing lid 15. The sides 19b of the slots are sharp edges. A small vent hole 20 is formed in lid 15 near aperture 19.

A plate 23 is adapted to fit onto the tops of the flanges 21b. Plate 23 is flat and has a width equal to the distance between the vertical portions 21a and a length equal to the length of the brackets 21. The dimensions of the plate 23 are thus coextensive with the dimensions of the rectangular aperture 19. This results in a clearance between the plate 23 and the plane that contains the lid 15 and aperture 19, as can be seen in FIG. 4.

A wick 25 extends through this clearance between the plate 23 and the lid 15. Wick 25 is not woven, rather it is a fiberglass felt of the same type that is used for heating and cooling insulation. The wick 25 is a long rectangular strip having a width that is the same as the distance between the vertical portions 21a. Preferably the width of wick 25 is about $1\frac{1}{8}$ inch and the uncompressed thickness about $\frac{1}{4}$ inch. The lengths of the aperture edges 19a and 19b are preferably equal and about $1\frac{1}{8}$ inch. The diameter of lid 15 in one embodiment is about $3\frac{5}{8}$ inches, and in another smaller embodiment, about $2\frac{3}{4}$ inches. This results in a square aperture 19 with a cross-dimensional about 30 percent of the width of the larger lid 15.

The thickness of the wick 25 is somewhat greater than the depth of the clearance between the plate 23 and the lid 15, so that the plate 23 will securely retain the wick 25. The wick 25 will compress between the edges of the plate 23 and the aperture edges 19b. When installed, as shown in FIGS. 3-5, the wick will have two ends 25a and 25b that extend substantially to the bottom of the container 13, submersed in the fuel 14. A central portion 25c will be pressed tightly against the aperture 19, protruding slightly above. The central portion 25c, as shown in FIG. 4, is substantially in the plane of the lid 15, and has dimensions the same or coextensive with the aperture 19. The protrusion of the central portion 25c above lid 15 will normally be less than the thickness of the wick 25 because the lower side of the central section 25c will normally be in contact with the plate 23. Also, normally the upper surface of central section 25c will be below rim 17.

As shown in FIG. 1, a plastic cover 27 is adapted to fit tightly over the rim 17. Cover 27 is a conventional cover or lid of the same type as used to secure products, such as coffee, after the metal lid has been opened. Cover 27 has a flat central portion that is located in a plane common with the upper edges of the rim 17 and a short distance above the metal lid 15. The upper surface of the wick central portion 25c will not contact the lid 27 under normal shipping and storage. Cover 27 prevents spillage during shipping and storage.

Figure 2:
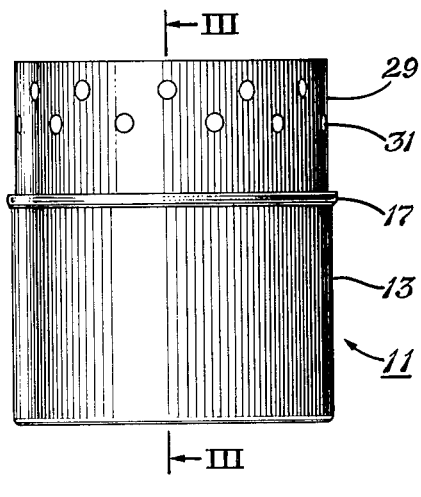
FIG. 2 is a side view of the cartridge of FIG. 1, showing the wind guard in place.

FIGS. 1-3 show a wind guard 29 adapted for use with the cartridge 11. Wind guard 29 is an annular metal band having an upright sidewall containing perforations 31. The diameter of the wind guard 29 is such that it will fit within the rim 17. The apertures 31 admit air to allow burning, but prevent strong wind currents from blowing out the flame. Wind guard 29 is normally required only while using outdoors.

To assemble the cartridge 11, a lid 15 is die cut to form the aperture 19, with the brackets 21 as shown. Then, the fiberglass felt is placed against the lower side of the aperture 19 and the plate 23 is moved into place. Brackets 21 and plate 23 thus serve as retaining means for retaining the wick 25 tightly in place. The brackets 21 serve as securing means for securing the plate 23 to the lower side of the lid 15. The container 13 is then filled with fuel 14. Then the lid 15 with the wick 25 is placed over the container 13. Then the rim 17 is formed by a conventional device such as used to secure food containers. Rim 17 will permanently secure the lid 15 to container 13. The cover 27 is then placed over the rim 17 to prevent leakage.

In operation, fuel 14 will saturate the central section 25c in the same manner as a conventional braided wick. To use the container, the cover 27 is removed and the wick portion 25c is lit by placing a match in close proximity to this portion. It is not necessary to pull the wick portion 25c upward to cause burning. However, in some cases, if more heat is desired, the wick center section 25c could be pulled upward a short distance to admit air between the plate 23 and wick center section 25c. Fuel will then burn at a faster rate.

When the user wishes to extinguish the flame, the top is covered to smother the flame, then the cover 27 is placed over the rim 17 to store the can for reuse. When the fuel 14 is depleted, the cartridge 11 is discarded. If one is using the cartridge 11 outdoors, the wind guard 29 can be placed on the lid 15.

The invention has significant advantages. The flat felt wick provides adequate heat for a long duration. The cartridge can be easily reused until the fuel is depleted. If the cartridge tips over while the cover is not in place, the plate will restrict the leakage of fuel outward through the aperture 19, allowing only a small quantity. The wind guard allows the use of the cartridge outdoors without the problem of the flame being extinguished by wind.

While the invention has been shown in only one of its forms, it should be apparent to those skilled in the art that it is not so limited but is susceptible to various changes without departing from the scope of the invention.

I claim:

1. A food warming cartridge with liquid fuel, comprising in combination:
    a liquid fuel container having a lid with a generally rectangularly shaped aperture therein;
    a generally rectangularly shaped wick having at least one end submersed in the fuel, a central section of the wick in contact with a lower side of the lid and which blocks the aperture; and retainer means for retaining the wick in contact with the lower side of the lid and holding the central section in a generally flat position parallel with the plane of the lid whereby a side of the central section is exposed so that an exposed side has the shape of the aperture.

2. The cartridge according to claim 1 wherein the wick is formed of fiberglass felt insulation material.

3. The cartridge according to claim 1 wherein the retainer means
    compresses a portion of the wick against the lower side of the lid to retain the wick in place.

4. A food warming cartridge, comprising in combination:
    a container adapted to hold liquid fuel and having a substantially flat lid with a aperture that has at least two straight sides;
    a wick having a rectangular transverse cross-section and two depending ends submersed in the fuel, the wick having a central section in contact with the lower side of the lid, blocking the slot, the central section having side edges substantially flush with the sides of the aperture;
    a plate in contact with the lower side of the central section of the wick, the plate having dimensions substantially as large as the aperture; and
    securing means for securing the plate to the lower side of the lid in a plane substantially parallel with the lid for pressing a portion of the central section of the wick into a generally flat position coextensive with the dimensions of the aperture and exposed to the exterior of the container.

5. The cartridge according to claim 4 wherein the wick is formed of fiberglass felt insulation material.

6. The cartridge according to claim 4 further comprising:
    an annular cylindrical metal ring having a single perforated sidewall, the ring adapted to rest on the lid, surrounding the wick for blocking wind currents.

7. The cartridge according to claim 4, wherein the securing means comprises:
    a pair of depending brackets extending downwardly from opposite sides of the aperture, each bracket having an inwardly extending flange for carrying the plate.

8. A food warming cartridge, comprising in combination:
    a cylindrical container having a substantially flat lid formed thereon which has a centrally located aperture, the aperture having at least two parallel sides, the aperture and lid being located substantially in a common plane;
    a plate mounted to the lid below the aperture a short distance and located in a plane substantially parallel with the lid, providing a clearance, the plate having dimensions substantially coextensive with the aperture; and
    a wick formed of a rectangular strip of fiber glass felt, the wick pressing tightly through the clearance between the plate and aperture and having side edges substantially flush with the parallel sides of the aperture, the wick having depending ends extending downwardly from opposite sides of the plate into the fuel.

* * * * *